May 28, 1935.  E. J. MURPHY  2,003,214
FREEZING APPARATUS
Filed Oct. 5, 1931  2 Sheets-Sheet 1
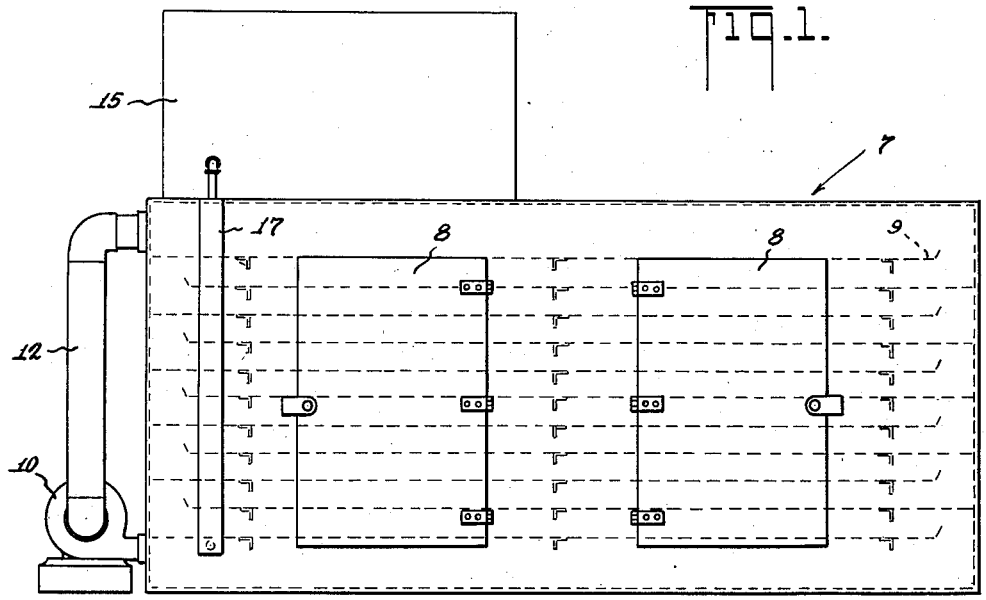
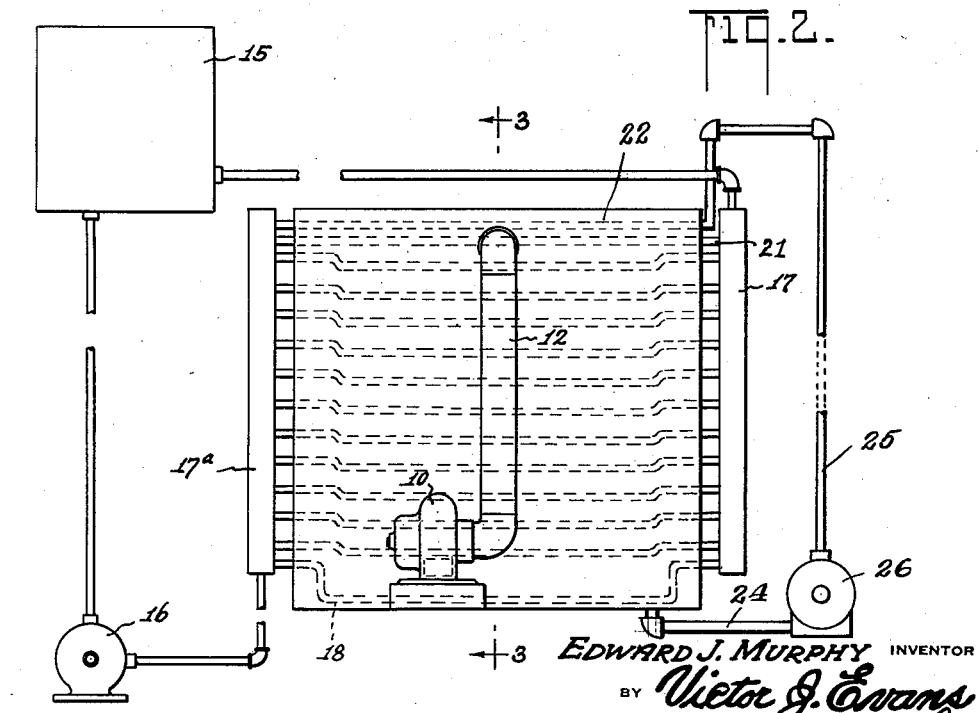

May 28, 1935.  E. J. MURPHY  2,003,214
FREEZING APPARATUS
Filed Oct. 5, 1931   2 Sheets-Sheet 2
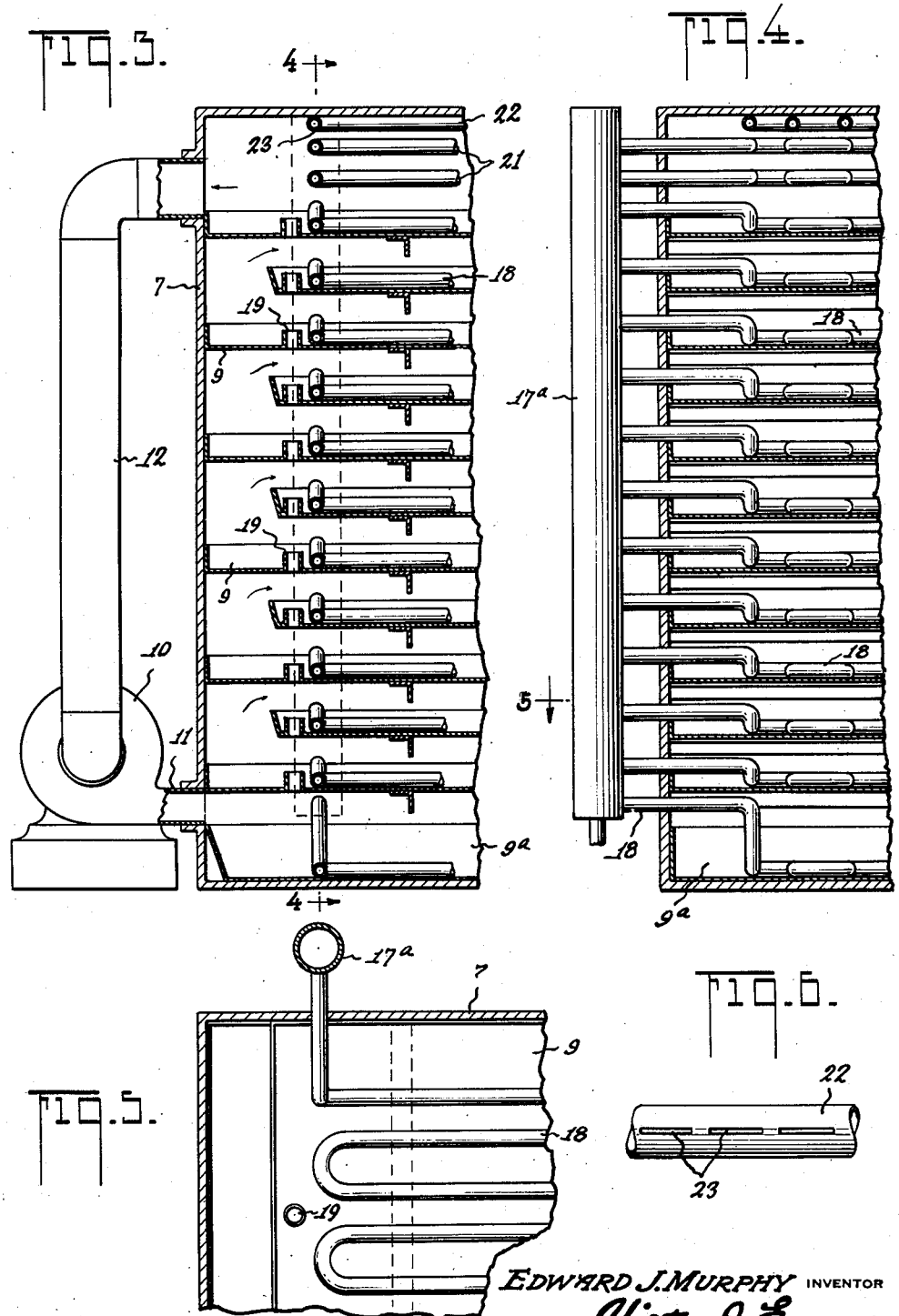
EDWARD J. MURPHY INVENTOR
BY Victor J. Evans
ATTORNEY
WITNESS:

Patented May 28, 1935

2,003,214

UNITED STATES PATENT OFFICE 2,003,214

FREEZING APPARATUS

Edward Joseph Murphy, Lynbrook, N. Y.

Application October 5, 1931, Serial No. 567,009

5 Claims. (Cl. 62—114)

The object of the invention is to provide an apparatus particularly adapted for freezing of perishable commodities which may be placed in the apparatus for a short time and have their temperature reduced to such a point that it may be possible to then preserve them indefinitely; to provide a freezing apparatus so constructed and operated that the air content thereof is kept to the desirable low temperature; to provide an apparatus having pans for the support of the cooling agent and circulating means for the same, the pans being so arranged as to provide a sinuous air passage by which the air is kept to the desirable low point; and to provide an apparatus of this character which is generally of simple form and therefore susceptible of cheap manufacture.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Fig. 1 is a side elevation of a refrigerator embodying my invention.

Fig. 2 is a left end elevation of Fig. 1.

Fig. 3 is a fragmentary section taken approximately on line 3—3 of Fig. 2, looking in the direction of the arrows.

Fig. 4 is a fragmentary vertical section taken approximately on the line 4—4 of Fig. 3, looking in the direction of the arrows.

Fig. 5 is a fragmentary horizontal section taken approximately on the line 5 of Fig. 4; and Fig. 6 is a fragmentary bottom plan view of a coil employed in the refrigerator.

Referring to the drawings for a more detailed description thereof, the numeral 7 indicates a cabinet having a pair of doors 8 in one side thereof. The cabinet contains a series of horizontal pans 9 arranged in superposed relation but spaced one from the other. The pans are of less length than the cabinet and succeeding pans are disposed with one wall against opposite ends of the cabinet, so that a sinuous path is provided under one pan, around the edge of that and back under the pan next above and around the edge of that and so on. This sinuous path is provided for the circulation of air through the cabinet, which is effected by means of a blower 10 having a peripheral discharge connected with the cabinet at one end adjacent the bottom by means of a pipe 11 and a center intake connected with the cabinet at the upper end by means of a pipe 12. The air is thus circulated under and over the pans for the absorption of heat from the contents to be placed in the cabinet for freezing.

From a brine cooling tank 15, through the instrumentality of a pump 16, there is circulated a refrigerating or freezing agent which flows first into the header 17 and thence into the coils 18, one of which is disposed in each of the pans 9. From the coils 18, the freezing agent passes into the header 17a and thence back into the brine tank. The freezing agent may be sodium or calcium brine, which is circulated in the coils 18, and the pans are charged with a similar liquid to the level determined by the overflow pipes 19, which in the illustrated embodiment will bring the level of the liquid in the pans to the plane of the top sides of the coils. The overflow pipes 19 may be made adjustable, however, to regulate the depth of the liquid in the pans.

The pan 9a which is disposed on the bottom of the cabinet is of considerably greater depth than the remaining pans, but it is not charged with any of the liquid, this pan serving to catch any overflow from the whole battery of pans. Obviously the overflow from one pan will be transferred to the next lower pan, and so on, so that any excess will be ultimately found in the pan 9a from which it is discharged into the pipe 24 and then raised thru a pipe 25 by means of a pump 26 to the coils 22 from which it drops into the topmost pan 9.

Above the topmost pan, there are disposed refrigerating coils 21 which are not immersed or submerged in any liquid but are arranged in the zone of the air return to the pipe 12. These coils serve as refrigerating coils to extract the heat from the air current passing through the sinuous path provided in the cabinet by the pans 9.

The refrigerating coils 21 are subject to frosting, which will cut down their efficiency as a refrigerating medium. To eliminate the frosting, there are provided the cleaner pipes 22, which are provided with apertures 23, as shown in Fig. 6. To defrost the coils 21, brine is directed into the pipes 22 by the pump 26, as described and, passing through the perforations 23, drops onto the coils 21, resulting in the removal of the frost therefrom, the brine then dropping into the topmost pan, from which, if it raises the level of the liquid therein higher than that prescribed by the overflow, passes to the next lower pan and so on down to the pan 9a.

The apparatus is designed primarily for quick freezing of perishable products so that they may thereafter be glazed in the customary manner for preservation. Whatever commodities are to be frozen, are placed in the cabinet on top of the coils 18 and may be either in pans of their own or laid directly on the coils, depending on whether it is necessary to keep them out of direct contact with the brine with which the coils are submerged. They are then subjected to the quick freezing properties of the brine and the air current circulating between the pans also serves to extract heat from the commodities being frozen, the heat thus taken up by the air current being removed by the refrigerating coils 21 to which the air current is subjected just prior to its return to the fan through the circulating pipe 12.

The brine in the pans has a two-fold purpose, the one to prevent the coils 18 from frosting and the other to contribute its part in the freezing operation.

What is claimed as new is:

1. In a freezing apparatus, a cabinet, a plurality of pans arranged in said cabinet in superposed relation and spaced from each other, said pans being of a width corresponding to the width of the cabinet but of a length less than the cabinet and arranged with alternate pans in contact with the same end wall of the cabinet and succeeding pans in contact with opposite end walls to provide a sinuous path for air currents over succeeding pans, a refrigerant-containing coil disposed in each pan, a liquid heat exchange medium disposed in each pan in contact with the coil therein, and air circulating means for extracting the air from the cabinet above the topmost pan and redelivering it below the lowermost pan.

2. In a freezing apparatus, a cabinet, a plurality of pans arranged in said cabinet in superposed relation and spaced from each other, said pans being of a width corresponding to the width of the cabinet but of a length less than the cabinet and arranged with alternate pans in contact with the same end wall of the cabinet and succeeding pans in contact with opposite end walls to provide a sinuous path for air currents over succeeding pans, a refrigerant-containing coil disposed in each pan, a liquid heat exchange medium disposed in each pan in contact with the coil therein, and air circulating means for extracting the air from the cabinet above the topmost pan and redelivering it below the lowermost pan, and a refrigerating coil in said cabinet above the topmost pan for contact with the air to cool the same prior to its entry to the air circulating means.

3. In a freezing apparatus, a cabinet, a plurality of pans arranged in said cabinet in superposed relation and spaced from each other, said pans being of a width corresponding to the width of the cabinet but of a length less than the cabinet and arranged with alternate pans in contact with the same end wall of the cabinet and succeeding pans in contact with opposite end walls to provide a sinuous path for air currents over succeeding pans, a refrigerant-containing coil disposed in each pan, a liquid heat exchange medium disposed in each pan in contact with the coil therein, and air circulating means for extracting the air from the cabinet above the topmost pan and redelivering it below the lowermost pan, and a refrigerating coil in said cabinet above the topmost pan for contact with the air to cool the same prior to its entry to the air circulating means, and a defrosting coil arranged above the last said refrigerating coil to discharge brine upon and defrost the same.

4. In a freezing apparatus, a cabinet, a plurality of pans arranged in said cabinet in superposed relation and spaced from each other, said pans being of a width corresponding to the width of the cabinet but of a length less than the cabinet and arranged with alternate pans in contact with the same end wall of the cabinet and succeeding pans in contact with opposite end walls to provide a sinuous path for air currents over succeeding pans, a refrigerant-containing coil disposed in each pan, a liquid heat exchange medium disposed in each pan in contact with the coil therein, and air circulating means for withdrawing the air from the cabinet above the topmost pan and redelivering it below the lowermost pan, said cabinet being provided with a bottom pan of substantially the length and breadth of the cabinet and all of the first said pans being provided with overflows to maintain a constant level of the liquid heat exchange medium therein.

5. In a freezing apparatus, a cabinet, a plurality of pans arranged in said cabinet in superposed relation and spaced from each other, said pans being of a width corresponding to the width of the cabinet but of a length less than the cabinet and arranged with alternate pans in contact with the same end wall of the cabinet and succeeding pans in contact with the opposite end wall to provide a sinuous path for air currents over succeeding pans, a refrigerating coil disposed in each pan, a liquid heat exchange medium disposed in each pan in contact with the coil therein, and air circulating means for extracting the air from the cabinet above the topmost pan and redelivering it below the lowermost pan, air cooling coils in the upper part of the cabinet, apertured defrosting coils above said air cooling coils and adapted to allow a defrosting liquid to fall on said coils, and means for raising the defrosting liquid from the bottom of the cabinet into the defrosting coils.

EDWARD JOSEPH MURPHY.